United States Patent [19]

Davis et al.

[11] Patent Number: 5,751,809
[45] Date of Patent: May 12, 1998

[54] APPARATUS AND METHOD FOR SECURING CAPTURED DATA TRANSMITTED BETWEEN TWO SOURCES

[75] Inventors: Derek L. Davis, Phoenix, Ariz.; Peter Jones, San Jose, Calif.

[73] Assignee: Intel Corporation, Santa Clara, Calif.

[21] Appl. No.: 795,452

[22] Filed: Feb. 4, 1997

Related U.S. Application Data

[63] Continuation of Ser. No. 538,189, Sep. 29, 1995, abandoned.
[51] Int. Cl.⁶ .................................................... H04K 1/00
[52] U.S. Cl. .................................................... 380/23; 380/49
[58] Field of Search .................................... 380/10, 5, 20, 380/23, 49, 30; 348/207, 460, 552

[56] References Cited

U.S. PATENT DOCUMENTS

| | | | |
|---|---|---|---|
| 5,005,200 | 4/1991 | Fischer | 380/30 |
| 5,136,646 | 8/1992 | Haber et al. | 380/23 |
| 5,136,647 | 8/1992 | Haber et al. | 380/23 |
| 5,189,700 | 2/1993 | Blandford | 380/23 |
| 5,321,749 | 6/1994 | Virga | 380/18 |
| 5,422,953 | 6/1995 | Fischer | 380/23 |
| 5,499,294 | 3/1996 | Friedman | 380/10 |

*Primary Examiner*—David C. Cain
*Attorney, Agent, or Firm*—Blakely, Sokoloff, Taylor & Zafman

[57] ABSTRACT

Implemented preferably within a video camera, a secure data capture device is used to prevent a captured data clip from be fraudulently altered without detection. The secure data capture device performs "time-bracketing" and/or "sequence ordering" operations to preserve data integrity through implementation of two registers incorporating a "State of the Universe" ("SOTU") number and a "sequence" number, respectively. Time-bracketing is performed by digitally signing a running hash value representing the data clip appended to the SOTU number before the digital signature is "timestamped". Sequence ordering is performed by digitally signing the digest of the data frame or multiple data frames along with the sequence number.

46 Claims, 6 Drawing Sheets

APPARATUS AND METHOD FOR SECURING CAPTURED DATA TRANSMITTED BETWEEN TWO SOURCES

This is a continuation of U.S. patent application (application Ser. No. 08/538,189) filed Sep. 29, 1995, now abandoned.

BACKGROUND OF THE INVENTION

1. Field of the Invention

The present invention relates to an apparatus and method for data security. More particularly, the present invention relates to a semiconductor device which prevents data captured by a capturing device from being unknowingly altered and provides mechanisms for maintaining the integrity of the data.

2. Description of Art Related to the Invention

As personal computers ("PCs"), networks and other equipment supporting digital data transfers have become more ubiquitous, the importance of data security has increased dramatically. For data security to be highly reliable, it must preserve the "integrity" of data transmitted between two sources. One limited technique used to preserve data integrity is through access control (i.e., user identification and authentication). Currently, efforts are being made to utilize an access control technique called "biometrics" which uses a capturing device primarily for facility security (e.g., buildings, rooms, etc.). Biometric techniques often involve digitally scanning a characteristic of the user (e.g., finger print, iris, retina, etc.) to capture at least one and more likely multiple frames of data (generally referred to as "data clip") of the characteristic and comparing the captured data clip with a previously stored master. If certain characteristics of the captured data clip match those of the stored master, the user is identified and authenticated.

In the past few years, electronic technology has become so sophisticated that alteration of a digitally captured data clip is becoming more difficult to detect as evidenced by certain special effects in recent feature films. As a result, security systems using biometrics (hereinafter individually referred to as a "biometric system") are now considered susceptible to fraudulent alteration of the captured data clip if the biometric system is not physically connected to a system or component processing or storing the captured data clip. The reason is that the communication path would likely be publicly accessible which allows interlopers an opportunity for the captured data clip to be (i) substituted for a prior recorded data clip, (ii) transferred in real-time from another location or (iii) combined with other non-existent images or characteristics.

In an effort to preserve data integrity, a technique called "time stamping" has recently been developed and is commercially offered from Surety Technologies, Inc. of Chatham, N.J. As shown in FIG. 1, an example of time-stamping is accomplished by a user processing a digital data set 110 (i.e., a string of data) through a cryptographically secure hash algorithm 120 (e.g., "MD5" algorithm developed by RSA Data Security, Inc. of Redwood City, Calif.) stored within a local source 100. This causes the digital data set 110 to be mapped from its arbitrary size into a significantly smaller, fixed size commonly referred to as a "digest" 130 having no information content.

Typically, the digest 130 is transferred (preferably electronically) to a centralized source 150 as indicated by a dotted line 140 and is subsequently hashed and combined with a number of other digests 160 from different sources in a "binary tree" fashion as shown. Thus, a variety of "intermediate digests" 170 are produced and finally a composite digest 180 is generated. Next, the composite digest 180 is widely published (e.g., printed in a publication, disseminated to all sources, stored in a trusted database, etc.) to establish that the data set 110 was in existence at least before the publication of the composite digest 180. However, there is no current mechanism for "time-bracketing" the digest 130 to ensure that the data set 110 existed after a particular point in time as well as before the publication. Time bracketing of a captured data clip would be useful to prevent fraudulent use of previously captured data clip. Moreover, there is no mechanism for securely "sequence ordering" the data frames of a data clip to prevent the sequence of data frames from being altered in order of occurrence to achieve the appearance that a certain sequence of events occurred.

BRIEF SUMMARY OF THE INVENTION

Based on the foregoing, it is apparent that there exists a need for a secure data capture device, employed within a capturing device which precludes a captured data clip from be altered without detection. Additionally, in order to further preserve the integrity of the data clip, it would be advantageous for the secure data capture device to include a "time-bracketing" mechanism which calculates and establishes a time period during which the data clip must have been captured by the capturing device and optionally a "sequence-ordering" mechanism which securely preserves the sequence in which multiple frames of data occur in the data clip.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention relates to a secure data capture device preferably employed in a capturing device and its corresponding method of operation. In the following description, some terminology is used to discuss certain well-known cryptographic functions. For example, a data clip is information digitized into binary data acquired for display as video, audio or text. This information includes at least one data frame. A "key" is an encoding and/or decoding parameter used by conventional cryptographic algorithms; namely public-key cryptographic algorithms such as, Rivest, Shamir and Adleman ("RSA"), symmetric key cryptographic algorithms such as Data Encryption Algorithm ("DEA") as specified in Data Encryption Standard ("DES") and the like. A "certificate" is defined as any digital information (typically a public key) associated with an entity, encrypted by a private key held by another entity such as a manufacturer or a widely published trusted authority (e.g., bank, governmental entity, trade association, etc.). A "digital signature" is similar to a certificate but is used for authenticating data, not its sender.

Figure 1:
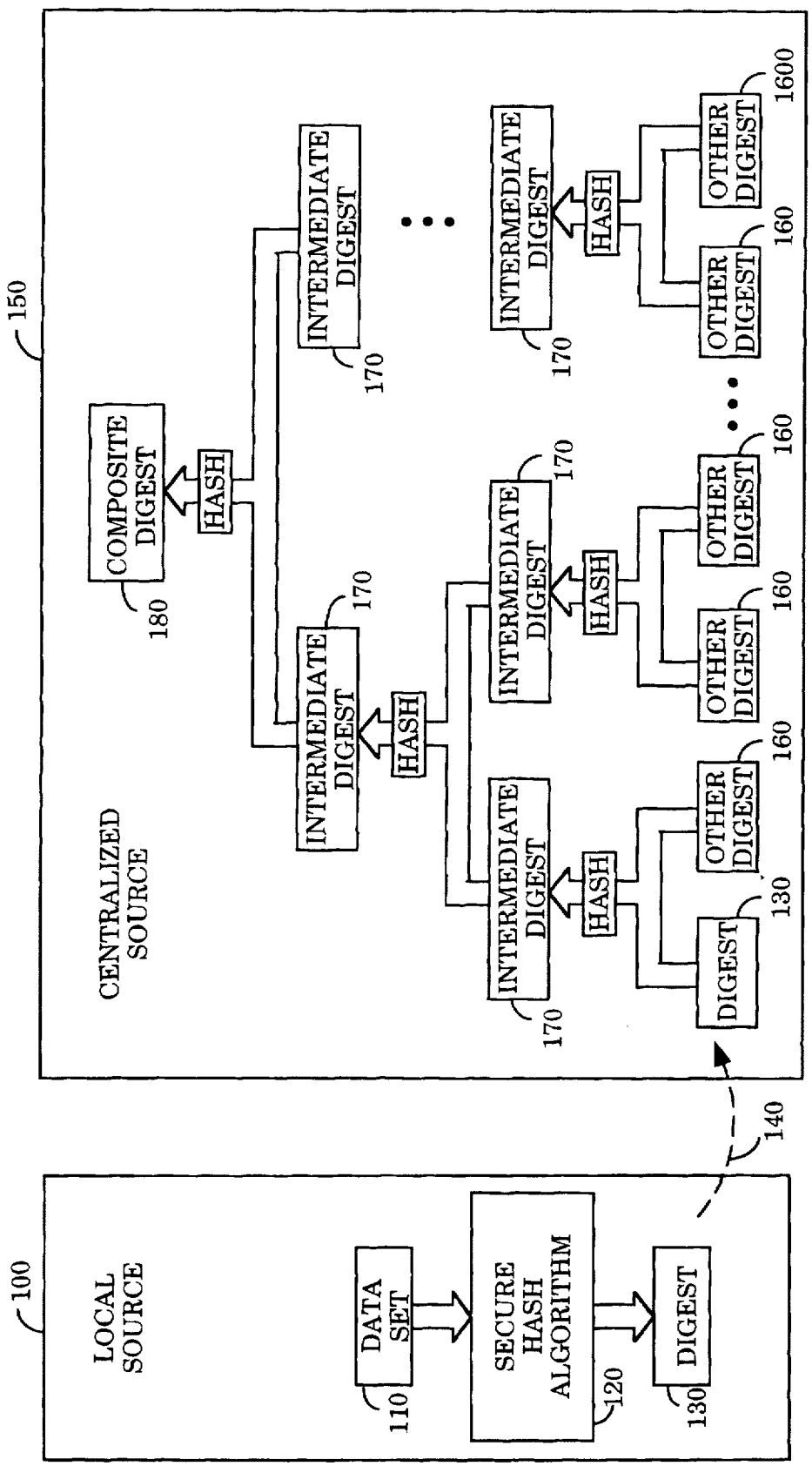
FIG. 1 is an illustrative flowchart of conventional time stamping operations undergone to produce a composite digest.
Figure 2:
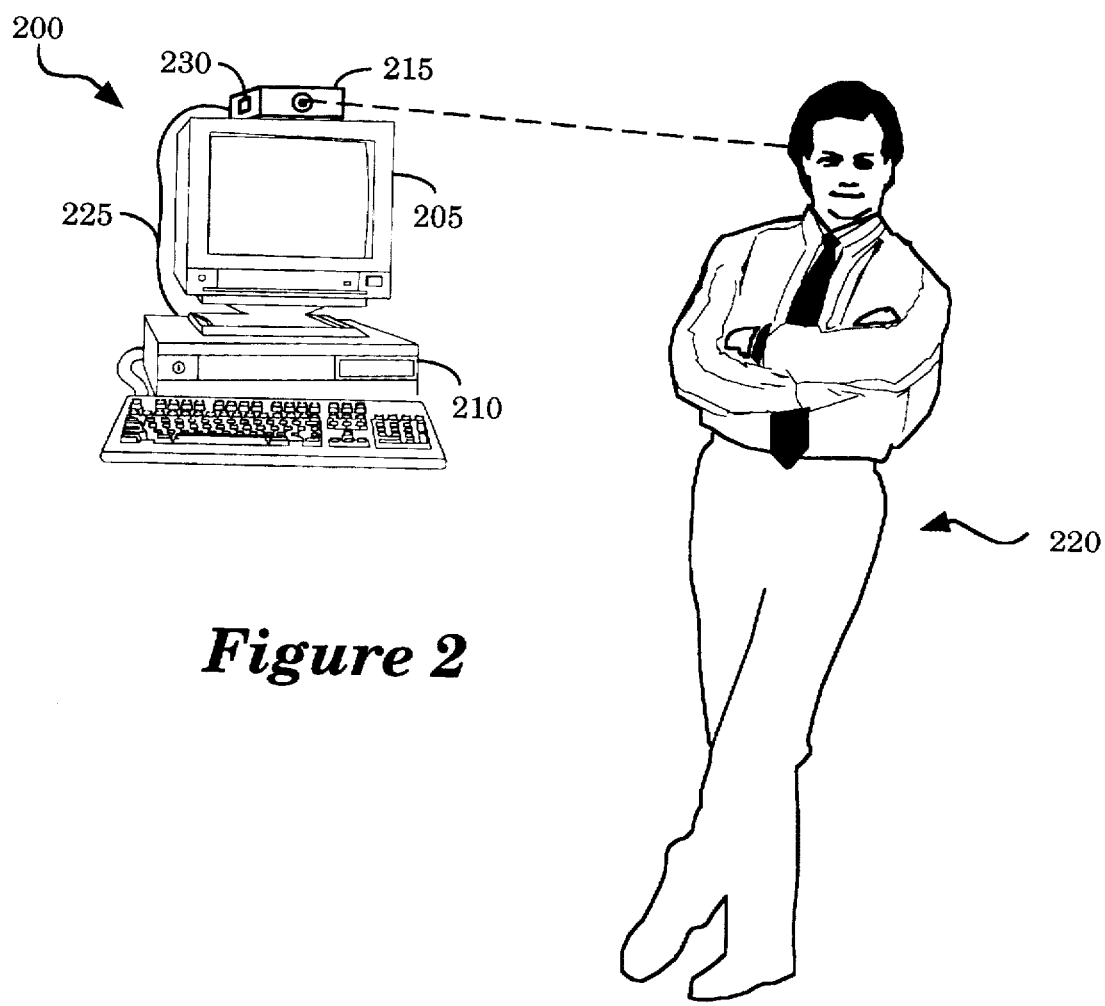
FIG. 2 is an illustrative block diagram of an embodiment of a computer system operating in combination with a capturing device employing a secure data capture device.

Referring now to FIG. 2, an illustrative embodiment of a capturing device 215 employing the present invention and operating in association with a computer system 200 is illustrated. The computer system 200 comprises a display monitor 205 having a PC platform 210 containing memory, processing hardware and the like. A capturing device 215 (e.g., a video camera, digital camera and the like) is positioned separate from the display monitor 205, implemented internally within the casing of the display monitor 205 or mounted onto the display monitor 205 as shown. As the capturing device 215 captures a data clip of desired data (e.g., physical characteristics of a computer user 220), it transmits the captured data clip to the PC platform 210 via a communication line 225. The communication line 225 may be represented as an electrical or fiber optic cable, a wireless communication link and the like.

Since the communication line 225 is publicly accessible, jeopardizing the integrity of the captured data clip, a secure data capture device 230 is employed within the capturing device 215. The secure data capture device 230 captures the data clip and securely transmits the captured data clip to the PC platform 210 by digitally signing each captured data frame or the entire data clip depending on which approach is preferred by the implementing entity.

It is contemplated, however, that other embodiments of the capturing device employing the secure data capture device may exist. For example, the capturing device may include internal storage capabilities. In that case, the secure data capture device 230 digitally signs the data clip before storage and would not require the communication line 225 to establish an electrical connection with the computer system. Of course, it is contemplated that the capturing device may be an audio recording device, similar to the secure data capture device of FIG. 4 (below), which digitizes audio clips to be digitally signed rather than visual images as discussed below. The spirit and scope of the present invention broadly rests the implementation of a secure data capture device in a first source, remote from a second source, in an effort to protect the integrity of data transmitted therebetween.

Figure 3:
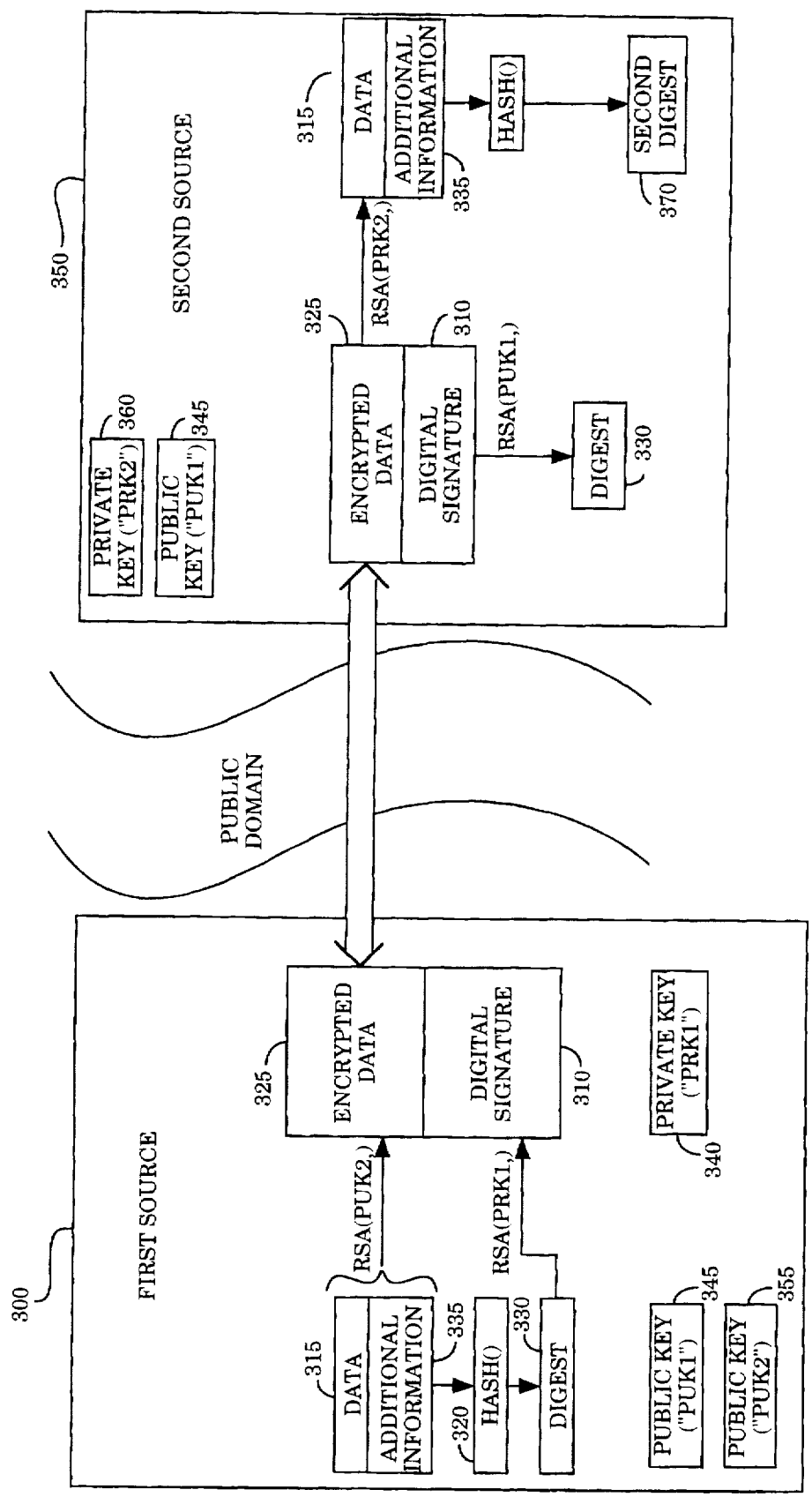
FIG. 3 is an illustrative block diagram of cryptographic operations performed by the secure data capture device.

As discussed above, a digital signature is used in the above-described embodiment to preserve the integrity of the contents of the data clip transmitted from the capturing device as well as authenticate the identity of the computer user without unnecessarily modifying the data clip. As shown in FIG. 3, the digital signature 310 is produced from data clip 315, obtained by a first source 300 (e.g., a capturing device 215 of FIG. 2), optionally combined with additional information 335 as shown, undergoing mathematical "hash" operations performed by a cryptographically secure hash algorithm 320 within the first source 300. This causes the data clip 315 to be mapped from its arbitrary size (typically large) into a significantly smaller size commonly referred to as a "digest" 330. Reverse engineering of the digest 330 in a timely manner is virtually impossible. Thereafter, the digest 330 is encrypted using a private key "PRK1" 340 of the secure data capture device 230 to produce the digital signature 310. The digital signature 310 accompanies the encrypted data 325, possibly encrypted by RSA using a public key ("PUK2") 355 of a second source 350 or an agreed upon symmetric key using DES, although encryption is not required, as it is transmitted to the second source 350 (e.g., the PC platform, storage memory or any other device receptive to the data).

The second source 350 decrypts the data 325, if necessary, using its private key "PRK2" 360 (or an agreed upon DES key) and performs hash operations on the received data 315 and optionally the additional information 335, identical to the hash operations performed in the first source 300, to produce a second digest 370. Concurrently, the second source 350 also decrypts the digital signature 310 using the public key of the secure data capture device "PUK1" 345 to obtain the digest 330 of the digital signature 310. The PUK1 345 may be provided by the first source through transmission of a certificate (e.g., a manufacturer's certificate) which is well-known in the art. The digests 330 and 370 are compared and if they are identical, both the integrity of the data and the authenticity of the sender can be assured.

Figure 4:
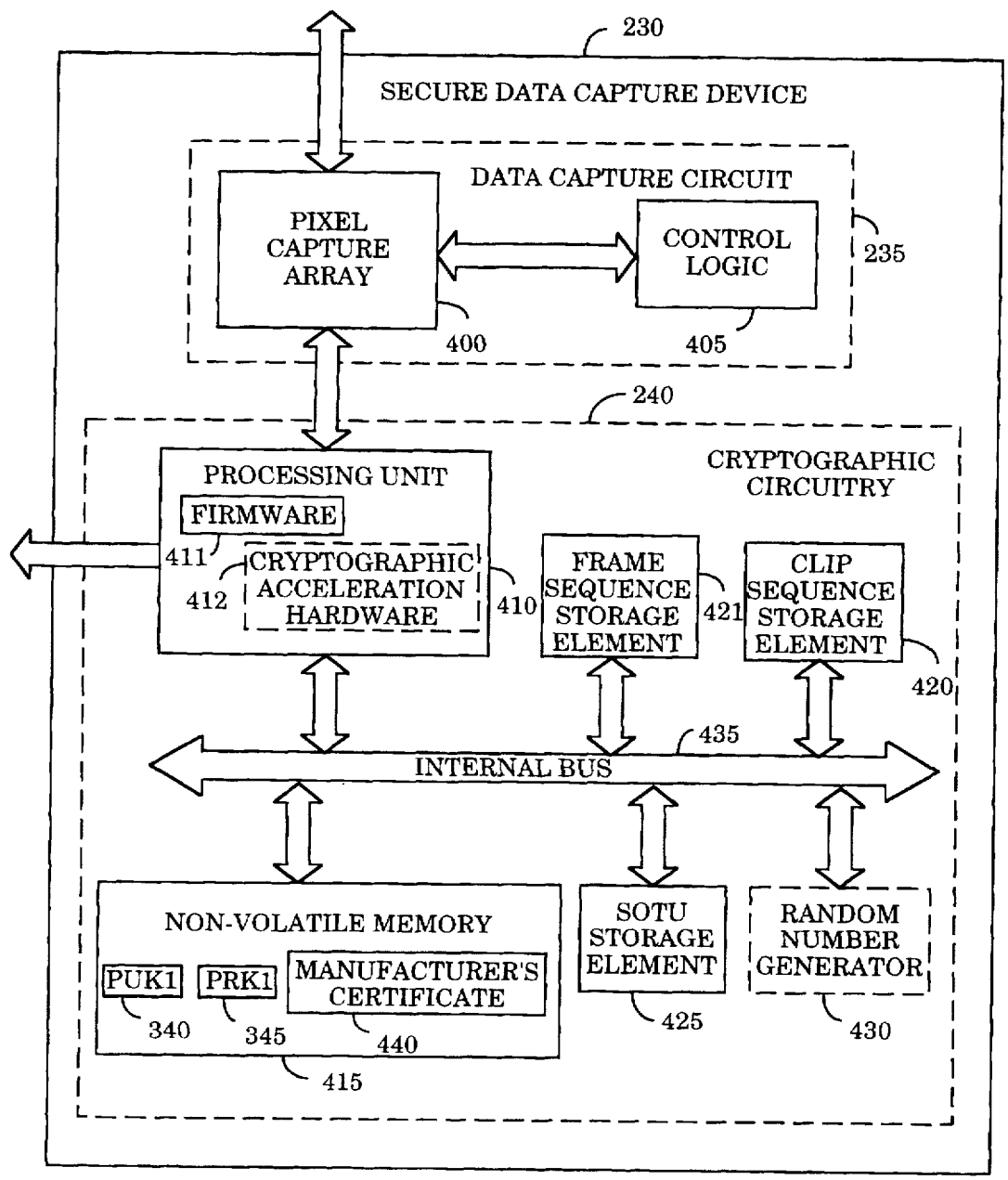
FIG. 4 is an illustrative block diagram of an embodiment of the secure data capture device.

Referring to FIG. 4, one embodiment of the secure data capture device 230 is shown. The secure data capture device 230 comprises a data capture circuit 235 and cryptographic circuitry 240, both of which are preferably integrated into one integrated circuit package to reduce vulnerability to physical tampering. The data capture circuit 235 is a conventional sensor such as, for example, a Charge Coupled Device "CCD" (the standard sensor used in camcorders), a DRAM-based video sensor or any other similar technology. In general, the video capture circuit 235 includes a pixel capture array 400 and control logic 405 controlling the pixel capture array 400.

The cryptographic circuitry 240 comprises a processing unit 410 coupled to a nonvolatile memory 415 (e.g., EPROM, Flash EPROM, VROM, EEPROM, etc.), a clip sequence ("CS") storage element 420, a frame sequence ("FS") storage element 421, a State of the Universe ("SOTU") storage element 425 and, optionally, a random number generator 430 through an internal bus 435 preferably implemented onto the same silicon as the data capture circuit 235. The processing unit 410 includes firmware 411 (e.g., in flash memory, read-only memory "ROM", random access memory "RAM" and the like) for execution of the RSA algorithm in digitally signing information as well as performing hash operations and storing a running hash value (described below). Optionally, cryptographic acceleration hardware 412 may be employed into the processing unit 410 as denoted by the dotted line representation.

The non-volatile memory 415 also stores a unique public/private key pair 340 and 345 associated with this secure data capture device 230 and a manufacturer's certificate 440 for authentication purposes. The internal storing of the unique public/private key pair 340 and 345 permits the captured data clip to be encrypted and/or digitally signed within the secure data capture device 230 prior to transmission from the processing element 410 to another processor or storage device remotely located in the second source. Moreover, this unique public/private key pair 240, and 245 and manufacturer's certificate 440 allows a remotely located system (e.g., PC platform) to uniquely identify the capturing device, authenticate it with a challenge/response protocol and, if desirable, establish a symmetric "session" key to support "symmetric key cryptography" to reduce the latency in encrypting and decrypting the data. As a result, it is virtually infeasible to tap into the communication path between these sources and substitute a prior recorded clip or alter the captured data clip without being detected by the second source.

Preferably, the CS storage element 420 and the FS storage element 421 are 32-bit registers which collectively store a 64-bit sequence number which is incremented after each capture of a data frame. Thus, the 64-bit sequence number is unique for each data frame captured by the secure data capture device 230 over its lifetime. Ideally, each time this sequence number is incremented, it is permanently stored and retrievable in the event of a power failure. This, however, would require the sequence number to be stored at an inconveniently high rate (e.g. 60 times/second for video capture).

To avoid imposing high storage rate, the sequence number is stored in two parts. More specifically, a "most significant" portion of the sequence number is stored in the CS storage element 420 while the "lesser significant" portion of the sequence number is stored in the FS storage element 421. As a result, the FS storage element 421 is incremented after each data frame capture; however, the CS register 420 is incremented if either of the following conditions occurs:

(1) a carry is generated out of the FS storage element (i.e., the contents of the FS storage element rolls over from "FFFFFFFF" to "00000000"); or (2) the secure data capture device is powered up.

With this implementation, the FS storage element 421 can be located in volatile memory, while the CS storage element 420 is located in non-volatile memory. While power is maintained, the sequence number increases sequentially (never repeating), yet the state of the sequence number need only to "logged" after every 232 successive captures before the secure data capture device is powered down.

If the secure data capture device loses power, the value stored in the FS storage element 421 (i.e., "frame sequence") is lost, but the value stored is the CS storage element 420 (i.e., "clip sequence") is incremented at the next power on, resulting in a new set of unique sequence numbers for the new captured data clip. Therefore, even if some frame sequence numbers are re-used, uniqueness for each data frame of the data clip is guaranteed.

Preferably, the SOTU storage element 425 is able to store 288 bits of data representing a large number. The SOTU storage element 425 is loaded with state information State value from outside the secure data capture device under system control (e.g., from the associated PC system) and may be reloaded at any time prior to capturing a data clip which relies on this state information. The state information is derived at a particular point in time and in such a way as to be unpredictable at any time prior to that point. For example, the state information may be a composite digest which is a hash value of potentially millions of data sets virtually unpredictable prior to the moment of its publication by the time stamping service provider. This SOTU storage element 425 may or may not be cleared at power down.

The random number generator 430 is used to generate the unique public and private keys as disclosed in a current pending application entitled "Apparatus And Method For Providing Secured Communications" (application Ser. No. 08/251,486) by Derek L. Davis, one of the joint inventors of the present invention. Its use is preferable but optional (as denoted by dotted line representation) depending on whether cryptographic functionality is desired.

Figure 5:
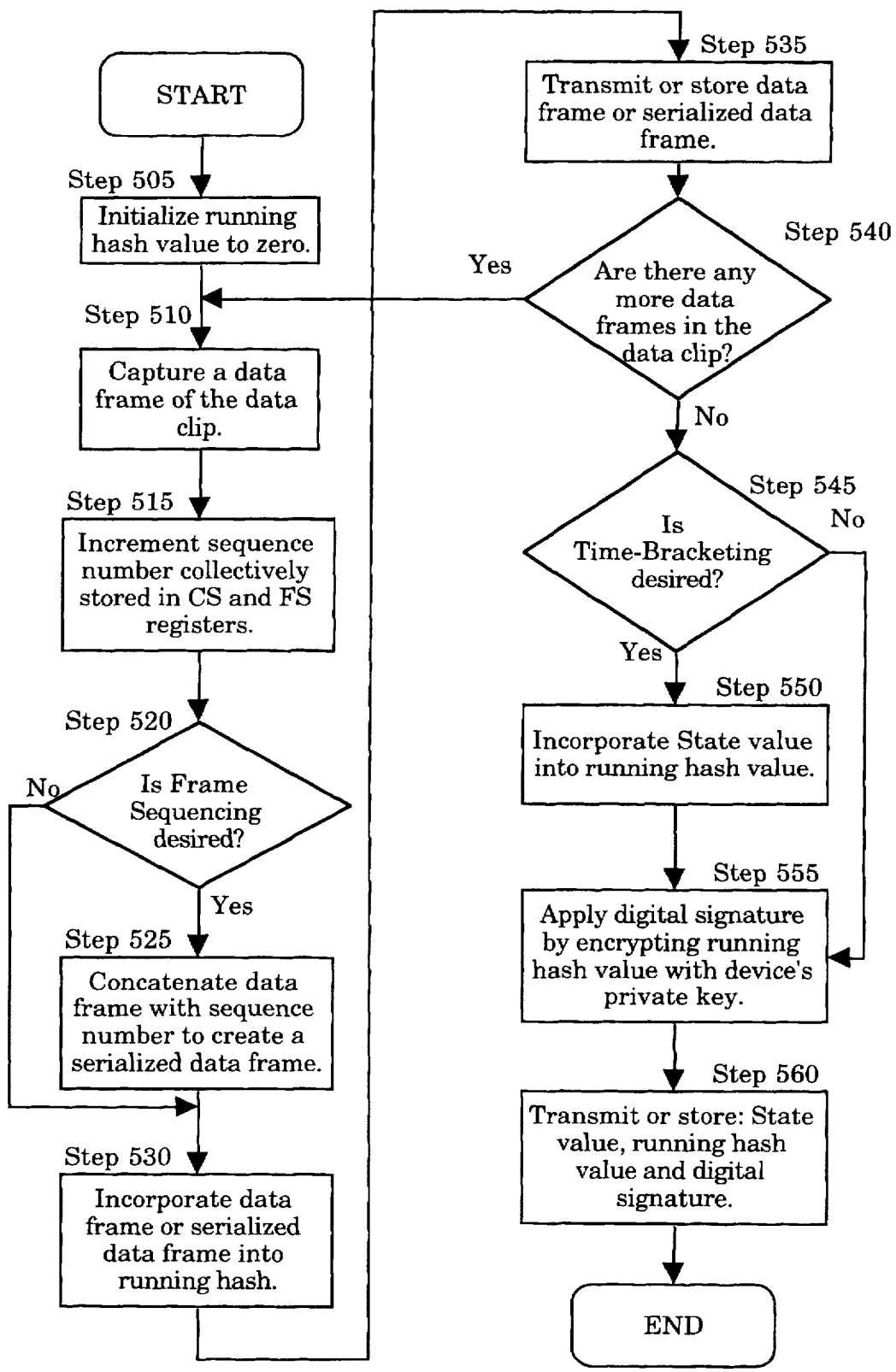
FIG. 5 is an illustrative flowchart showing those procedural steps undertaken by the secure data capture device in protecting the integrity of a captured data clip through time-bracketing and sequence ordering.

Referring now to FIG. 5, the operational steps performed by the secure data capture device in transmitting secured data to the second source is illustrated. The SOTU storage element contains previously loaded state information (State value) from outside the device, which cannot be changed once the steps described in FIG. 5 have commenced. In other words, FIG. 5 represents an "atomic" process during which the contents of the SOTU storage element is not modifiable.

Prior to capturing a data clip, an internally-stored "running hash" value is initialized to zero at Step 505. The running hash is a continuously updated hash value stored within the computer prior to transmission for time bracketing. At Step 510, a data frame of the data clip is captured by the sensor of the device (e.g., the pixel sensor array of a CCD) and sequence number is incremented by 1 at Step 515. If frame sequencing is required (Step 520), then the sequence number is concatenated with the data frame to create a serialized data frame at Step 525. Thereafter, the data frame or the serialized data frame is hashed to be incorporated as the running hash value (Step 530). In the case of single frame captures (as opposed to clips), the running hash value will represent only the hash result of the data frame or serialized data clip, since no data frames will have been previously incorporated into this running hash value.

Next, the data frame or serialized data may be transmitted to the second source or stored externally (Step 535). Additionally, the data frame or serialized data clip may be optionally encrypted (for privacy purposes) prior to such transmission or storage. If the data clip is being captured, where a signature is not required on each individual data frame, and more frames are to be captured as part of the data clip, then the process captures another data frame associated with the data clip (Step 540). If no more frames are to be included in the data clip, or the data clip is only a single data frame, then the process continues to Step 545.

At Step 545, a decision is made as to whether the data clip is to be time-bracketed using the State value contained in the SOTU storage element. If so, the State value is incorporated (e.g., combined in any manner including through addition, concatenation and any other bit manipulations) in the running hash value at Step 550. In Step 555, the running hash value is digitally signed using the private key of the capture device. Finally, in Step 560, the State value, optionally the running hash value if time bracketing, and signature are transmitted to or stored within the second source. The data clip, sequence numbers, State value and digital signature may be then analyzed at the second source to determine validity as shown in FIG. 3.

It is contemplated that this time-bracketing technique cannot be used effectively when the operations of capturing the data clip and digitally signing the data clip are not atomic (i.e., the operations are independent). The reason is that if the data clip is available to software or other inherently insecure data handling systems, one cannot be sure that the data clip was not created at an earlier point in time and thereafter, the State value and/or sequence number inserted before the digital signature is performed. The salient feature is that the contents of the SOTU storage element are established prior to the data clip capture. The SOTU storage element may not (by device design) be loaded between Steps 515 and 540.

Figure 6:
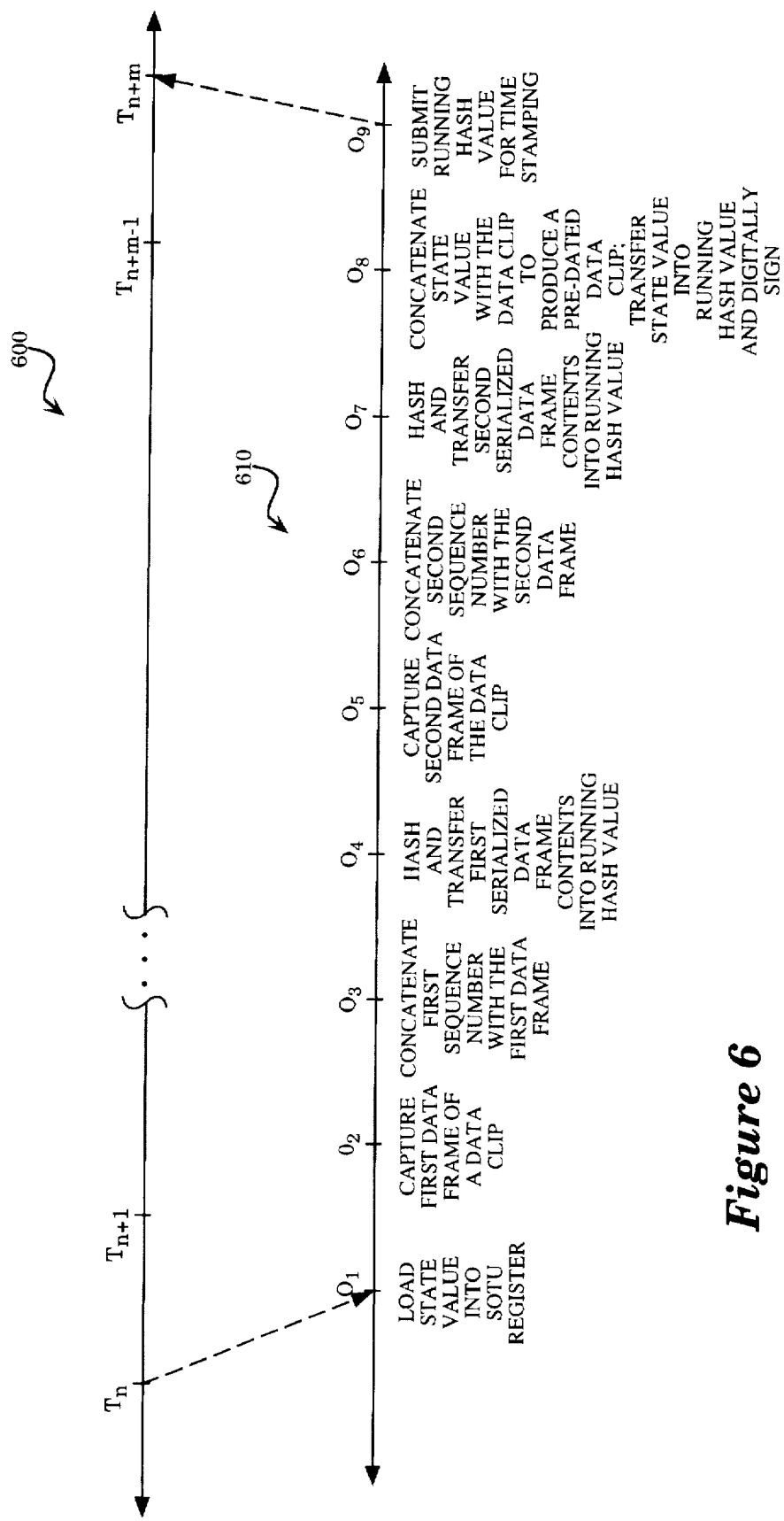
FIG. 6 is an illustrative timing flowchart showing how a data clip is time-bracketed between two points in time.

Referring to FIG. 6, illustrative timelines of time-ordered events that provide time-bracketing of a captured data clip are shown. A first timeline 600 includes time periods "$T_x$" representing periodic publication dates occurring every second, minute, hour, day, week or any specific time duration. The indices "n" and "m" represent whole numbers where "$T_n$" occurs before "$T_{n+m}$". A second timeline 610 indicates successive operational steps ("$O_i$", $1 \leq i \leq 9$) required to be performed by the capturing device, more particularly the secure data capture device, in order to "time-bracket" information. These operational steps are independent from above-identified publication dates which are simply used for illustrative purposes. First, after "$T_n$", a State value is loaded into the SOTU storage element such as, for example, a published composite digest or a hash of an electronic version of a front page of a newspaper. It is infeasible to predict the value of either of these numbers substantially prior to their publication.

Thereafter, the capture of a first data frame of a data clip may commence for $O_2$, but once commenced, the SOTU storage element may not be loaded until the current operation has ended. After the first data frame is captured, a determination is made as to whether frame sequencing is desired. If so, a first sequence number is concatenated with the first data frame to produce a first serialized data frame as shown for $O_3$. The first serialized data frame, or the first data frame in the event that frame sequencing is not desired, is hashed and stored in a running hash per $O_4$. This process is continued for a second data frame of the data clip (as shown for $O_5$–$O_7$) and any subsequent data frames forming the data clip.

For $O_8$, after all related capture operations are complete, the State value of the SOTU storage element is concatenated with the data clip to produce a pre-dated data clip. Moreover, the State value is incorporated into the running hash value which is digitally signed. Once the signing is completed, the SOTU storage element may be loaded in preparation for capturing the next data clip. It is contemplated, however, that the running hash value and optionally its digital signature must be submitted to a time-stamp provider service to complete the time bracketing operation for $O_9$.

By designing the hardware such that the SOTU storage element cannot be loaded for use with a previously captured data clip, assurance is provided that any data clip signed with a particular State value must have been captured by the device after that State value was published (labeled time point "$T_n$" in FIG. 6). By submitting the running hash value to the time-stamp service provider, assurance is provided that the data clip must have been captured prior to that point in time (labeled time point "$T_{n+m}$" in FIG. 6). Thus, the captured data clip is "bracketed" in time to exist between time points $T_n$ and $T_{n+m}$.

While various embodiments of the invention have been described, those skilled in the art will realize that other embodiments of the invention are easily foreseeable without departing from the spirit and scope of the present invention. Moreover, well known circuitry and operational steps are not set forth in detail in order to avoid unnecessarily obscuring the present invention. The invention should, therefore, be measured in terms of the following claims.

What is claimed is:

1. A semiconductor device comprising:
   sensing means for capturing a data clip; and
   cryptographic means, coupled to said sensing means, for preserving integrity of said data clip, said cryptographic means includes
      storage means for storing a unique key pair, a running hash value and a State value,
      processor means for performing operations on said data clip to establish that said data clip was captured after publication of said State value prior to said running hash value undergoing a time-stamping operation, and
      bus means for enabling said processor means to communicate with said storage means, said bus means being coupled to said processor means and said storage means.

2. The semiconductor device according to claim 1, wherein said storage means of said cryptographic means further stores at least a sequence number being unique for each data frame of said data clip.

3. The semiconductor device according to claim 2, wherein said storage means of said cryptographic means includes a non-volatile memory element.

4. The semiconductor device according to claim 3, wherein said storage means of said cryptographic means further includes a volatile memory element.

5. The semiconductor device according to claim 4, wherein said storage means of said cryptographic means further includes a clip sequence storage element, said clip sequence storage element is non-volatile memory which contains a clip sequence number being a first plurality of bits of said sequence number.

6. The semiconductor device according to claim 5, wherein said storage means of said cryptographic means further includes a frame sequence storage element, said frame sequence storage element is volatile memory which contains a frame sequence number being a second plurality of bits of said sequence number.

7. The semiconductor device according to claim 6, wherein said storage means of said cryptographic means further includes a state storage element which contains said State value loaded prior to said sensing means capturing said data clip.

8. The semiconductor device according to claim 1, wherein said sensing means is a sensor including a pixel capture array and control logic controlling said pixel capture array.

9. The semiconductor device according to claim 1, wherein said processor means performing a hash operation on said data clip before subsequent storage in said storage means as a first portion of said running hash value.

10. The semiconductor device according to claim 9, wherein said processor means producing a hash result for each data frame of said data clip in which each hash result is subsequently stored in said storage means to collectively produce said first portion of said running hash value.

11. The semiconductor device according to claim 10, wherein said processor means concatenating said first portion of said running hash value with said State value to produce said running hash value, digitally signing said running hash value to be output to an external source performing the time-stamping operation.

12. The semiconductor device according to claim 11, wherein prior to said processing means concatenating said first portion of said running hash value with said State value, said processing means further concatenating at least one hash result with a corresponding sequence number to produce at least one serialized data frame forming said data clip.

13. The semiconductor device according to claim 1, wherein said cryptographic means further includes a random number generator to generate said unique key pair.

14. A semiconductor device comprising:
   a sensor to capture a data clip; and
   a cryptographic circuit coupled to said sensor, said cryptographic circuit being capable of preserving integrity of said data clip by establishing that said data clip was captured after publication of a State value, said cryptographic circuit includes
      at least one storage element capable of containing said State value and a running hash value being a hash result of said data clip combined with said State value, said State value loaded prior to said sensor capturing said data clip,
      a processor capable of (i) performing operations on said data clip to produce said hash result, (ii) digitally signing said running hash value and (iii) enabling at least said running hash value to be output for time-stamping, and a bus coupled to said plurality of storage elements and to said processor, the bus enables said processor to communicate with said plurality of storage elements. 15. The semiconductor device according to claim 14, wherein said at least one storage element of said cryptographic circuit includes a first storage element capable of containing a unique key pair;

a second storage element capable of containing said running hash value;

a third storage element capable of containing said State value loaded prior to said sensor capturing said data clip;

a fourth storage element capable of containing a clip sequence number which is incremented after power-up of the semiconductor device; and a fifth storage element capable of containing a frame sequence number which is incremented after said sensor captures a data clip, said frame sequence number is appended to said clip sequence number to form a sequence number.

16. The semiconductor device according to claim 15, wherein at least said first storage element and said fourth storage element of said cryptographic circuitry are made of non-volatile memory.

17. The semiconductor device according to claim 16, wherein at least said fifth storage element of said cryptographic means is made of volatile memory.

18. The semiconductor device according to claim 14, wherein said cryptographic circuit further includes a random number generator to generate values associated with at least one key.

19. The semiconductor device according to claim 14, wherein said sensor includes a pixel capture array and control logic controlling said pixel capture array.

20. The semiconductor device according to claim 14, wherein prior to said processor of said cryptographic circuit producing said hash result, said processor concatenates at least one data frame with a corresponding sequence number to produce at least one serialized data frame forming said data clip.

21. A data capture system comprising:

a first source including:

a sensor to capture a data clip, and a cryptographic circuitry coupled to said sensor, said cryptographic circuitry capable of performing a first time-bracketing procedure on said data clip to establish that said data clip was captured after publication of a State value, said cryptographic circuitry includes at least one storage element to contain said State value, a processor capable of producing a running hash value based on both a hash result of said data clip and said State value, and of digitally signing at least said running hash value, and a bus coupled to said at least one storage element and to said processor, said bus enabling said processor to communicate with said at least one storage element; and a second source in communication with the first source, the second source performing a second time-bracketing procedure by performing a time-stamping operation on information including said running hash value provided by the first source.

22. A data capture system comprising:

transmitting means for capturing a data clip and for preserving an integrity of said data clip by performing a first time bracketing procedure on said data clip before transmitting said data clip, said transmitting means includes sensor means for capturing said data clip, and cryptographic means, coupled to said sensing means, for preserving integrity of said data clip, said cryptographic means includes storage means for storing a unique key pair, a running hash value and a State value, processor means for performing operations on said data clip to establish that said data clip was captured after publication of said State value, and bus means for coupling said processor means to said storage means; and receiving means for receiving said running hash value from the transmitting means and for performing a second time-bracketing procedure by time-stamping information including said running hash value.

23. A method for preserving integrity of a data clip transmitted from a first source to a second source, the method comprising the steps of:

capturing a first data frame of the data clip;

producing a first serialized data frame by hashing at least said first data frame;

incorporating said first serialized data frame to a running hash value;

incorporating a State value to said running hash value;

digitally signing said running hash value to produce a digital signature of said running hash value; and performing a time-stamping operation on at least said running hash value.

24. The method according to claim 23, wherein prior to said step of capturing said first data frame, the method further comprises a step of loading said State value into the first source.

25. The method according to claim 24, wherein prior to said step of capturing said first data frame, the method further comprises a step of loading a sequence number into the first source.

26. The method according to claim 25, wherein said step of loading said sequence number includes the steps of loading a clip sequence number into a non-volatile memory element of the first source, said clip sequence number being a plurality of bits forming said sequence number; and loading a frame sequence number into a volatile memory storage element of the first source, said frame sequence number being a plurality of bits forming said sequence number, excluding said plurality of bits forming said clip sequence number.

27. The method according to claim 26, wherein said step of producing said first serialized data frame includes the step of concatenating said first data frame with said sequence number associated with said first data frame to produce said first serialized data frame.

28. A semiconductor device comprising:

a sensor to capture a data clip; and a cryptographic circuit coupled to the sensor, said cryptographic circuit including:

at least one storage element capable of containing a running hash value and a State value loaded prior to the data clip being captured, a processor coupled to the at least one storage element, the processor capable of performing operations on the data clip to establish that the data clip was captured after publication of the State value prior to at least the running hash value being output from the cryptographic circuit.

29. The semiconductor device according to claim 28, wherein the processor executes a hash function on the data clip to produce a hash result being stored as a first portion of the running hash value.

30. The semiconductor device according to claim 28, wherein the processor produces a hash result for each data frame of the data chip to collectively produce a first portion of the running hash value.

31. The semiconductor device according to claim 30, wherein the processor combining the first portion of the running hash value with the State value to produce the running hash value and digitally signing said running hash value.

32. The semiconductor device according to claim 28 functioning as a microprocessor.

33. A capturing device comprising
an output port; and
a semiconductor device capable of preserving integrity of a data clip before transmission to the output port, the semiconductor device including
a sensor to capture a data clip, and
a cryptographic circuit coupled to the sensor, said cryptographic circuit including
at least one storage element capable of storing a running hash value being a hash result of the data clip combined with a State value and the State value loaded prior to the data clip being captured, and
a processor coupled to the at least one storage element, the processor capable of performing operations on the data clip to establish that the data clip was captured after publication of the State value before the running hash value is output through the output port.

34. The capturing device according to claim 33, wherein the output port is coupled to a communication line to allow at least said running hash value to be downloaded to a computer system.

35. A cryptographic circuit comprising:
at least one storage element to contain a running hash value and a State value loaded prior to a data clip being captured; and
a processor coupled to the at least one storage element, the processor to perform operations on the data clip to establish that the data clip was captured after publication of the State value and prior to publication of information including at least the running hash value.

36. The cryptographic circuit according to claim 35, wherein the operations by the processor include performing a hash operation on the data clip before subsequent storage in the at least one storage element as a first portion of the running hash value.

37. The cryptographic circuit according to claim 35, wherein the operations by the processor include producing a hash result for at least one data frame of the data clip in which each hash result is subsequently stored in the at least one storage element to collectively produce the first portion of the running hash value.

38. The cryptographic circuit according to claim 37, wherein the operations by the processor include incorporating the State value with the first portion of the running hash value to produce the running hash value.

39. The cryptographic circuit according to claim 38, wherein the operations of the processor further include digitally signing the running hash value to be output to an external source performing a time-stamping operation.

40. The cryptographic circuit according to claim 38, wherein prior to the processor producing the running hash value, the processor further concatenating the hash result with a corresponding sequence number to produce at least one serialized data frame forming the data clip.

41. A method comprising the steps of:
capturing a first data frame;
producing a hash result of the first data frame;
producing a running hash value based on the hash result and a State value; and
performing a time-stamping operation on at least the running hash value.

42. The method according to claim 41, wherein prior to the computing step, the method further comprising the step of:
obtaining the State value from a remote source.

43. A semiconductor device comprising:
a sensor to capture a data clip; and
a cryptographic circuit coupled to the sensor, said cryptographic circuit including:
at least one storage element capable of containing a State value prior to the data clip being captured,
a processor coupled to the at least one storage element, the processor capable of producing a hash result for each data frame of the data clip to collectively produce a first portion of a running hash value and of performing operations on the data clip to establish that the data clip was captured after publication of the State value and prior to at least the running hash value being output from the cryptographic circuit.

44. The semiconductor device according to claim 43, wherein the processor capable of combining the first portion of the running hash value with the State value to produce the running hash value.

45. A capturing device comprising
an output port; and
a device including
a sensor to capture a data clip, and
a cryptographic circuit coupled to the sensor, said cryptographic circuit including
at least one storage element capable of containing a State value loaded prior to the data clip being captured, and
a processor coupled to the at least one storage element, the processor capable of producing a hash result for each data frame of the data clip in order to produce a first portion of a running hash value and of performing operations on the data clip to establish that the data clip was captured after publication of the State value and before the running hash value is output through the output port.

46. The capturing device according to claim 45, wherein the output port is coupled to a communication line to allow at least said running hash value to be downloaded to a computer system.

* * * * *